Jan. 12, 1954 A. C. HEEHLER 2,666,194
WARNING LIGHT FOR EMERGENCY VEHICLES
Filed Dec. 24, 1952 3 Sheets-Sheet 2
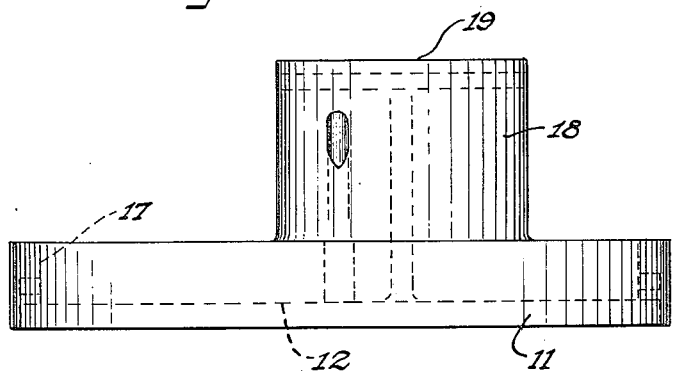
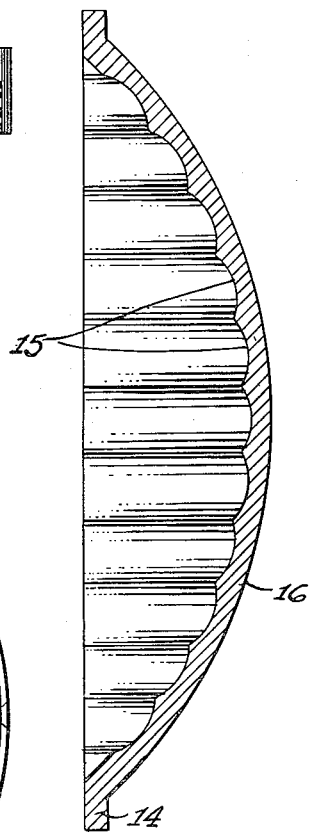
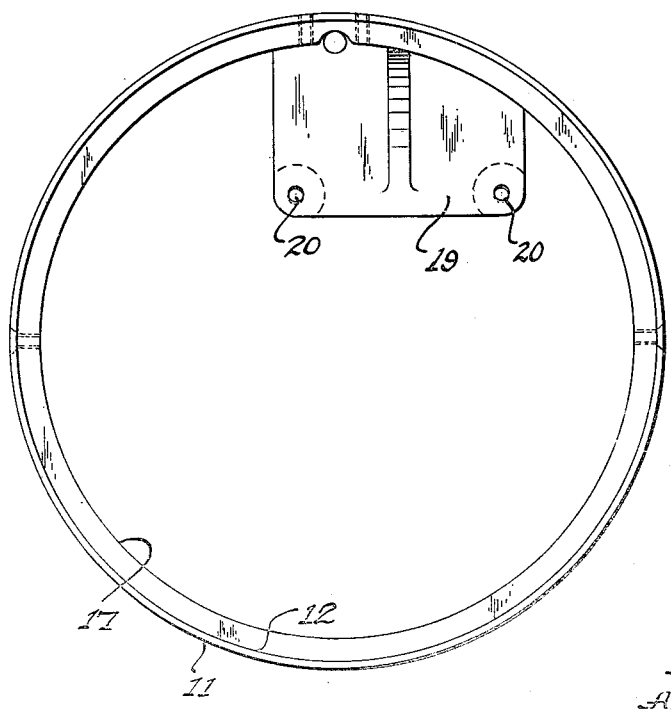
Inventor
Arthur C. Heehler Jan. 12, 1954 A. C. HEEHLER 2,666,194
WARNING LIGHT FOR EMERGENCY VEHICLES
Filed Dec. 24, 1952 3 Sheets-Sheet 3

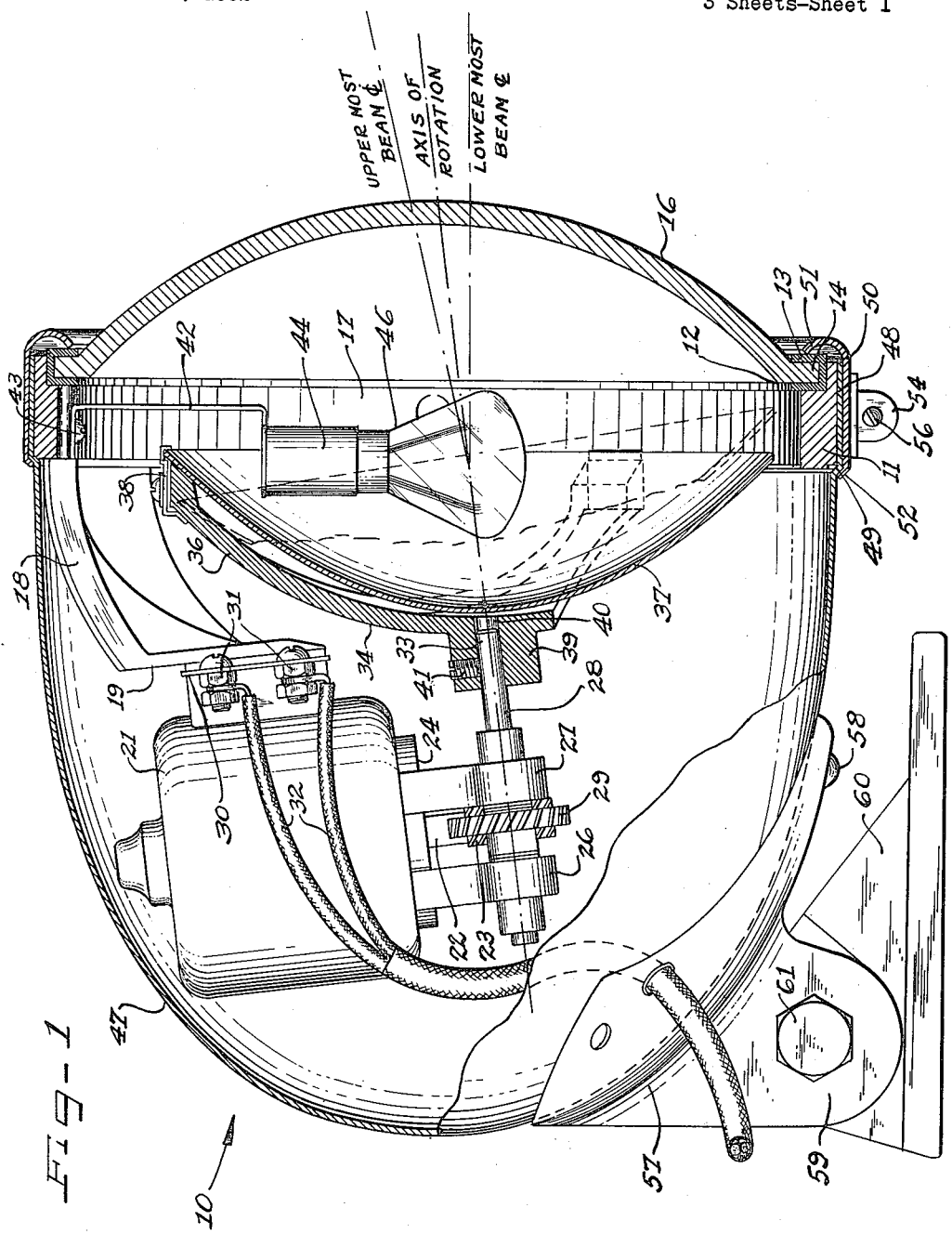

Inventor
Arthur C. Heehler

Patented Jan. 12, 1954

2,666,194

UNITED STATES PATENT OFFICE 2,666,194

WARNING LIGHT FOR EMERGENCY VEHICLES

Arthur C. Heehler, Chicago, Ill., assignor to The Pyle-National Company, Chicago, Ill., a corporation of New Jersey Application December 24, 1952, Serial No. 327,766

8 Claims. (Cl. 340—50)

This invention relates generally to illumination apparatus and more particularly to improved warning light structures for emergency vehicles and methods of producing movable light patterns.

Although the preferred structural embodiments herein described are of general utility, the principles of the present invention find a particularly useful application in connection with warning and signaling lights, for example, warning light structures which are adapted to be placed upon an emergency vehicle such as an ambulance or a vehicle driven by law enforcement officers and in connection with which the light is operated in order to produce a spectacular visual warning by means of a movable light pattern.

According to the general principles of the present invention, a pencil-type beam of light is projected along a longitudinal axis and has a beam spread of predetermined angular divergence. The beam of light is moved in a light pattern as the generatrix of a right conical surface having an angle of displacement from the longitudinal axis greater than the predetermined angular divergence of the beam spread. The normal beam spread is increased in one direction only, for example, in horizontal direction, to an angular divergence greater than the angular displacement of the beam of light from the longitudinal axis in generating the conical surface without materially increasing the beam spread in a direction normal to the spreading direction. Thus, there is produced a conical light pattern wherein any conical frustum in the light pattern includes a substantial finite area which is traversed a plurality of times by the beam upon each single generation of the conical surface. In other words, a multiple flash effect occurs in a visual field covering a substantial area of the light pattern, preferably the critical area directly in front of the vehicle carrying the emergency warning light.

Additionally, the light pattern includes substantial areas in the visual field on opposite sides of the multiple flash area which are traversed at least once upon each generation of the conical surface.

An exemplary structural embodiment of a warning light capable of developing the functions outlined above and incorporating the principles of the present invention includes an annular frame member having a center opening therethrough lying on a longitudinal axis and carrying an incandescent lamp bulb which extends towards the center of the frame member. The frame member is further provided with a rearwardly extending bracket portion carrying an electric motor. A parabolic reflector is aligned in proper focal relationship to the incandescent bulb and projects a beam of light through the center opening of the frame member past the bulb. A lens is carried on one side of the ring and a hollow casing having an open annular end is mounted on the ring to project therefrom towards the opposite side into enclosing relationship with the motor and the reflector. A pair of non-intersecting shafts making an angle of 90° with each other are provided, one of the shafts comprising a drive shaft for the motor and having a worm thereon and the other of the shafts carrying the reflector and having a gear engaging the worm. The reflector is preferably angularly offset relative to the rotational axis of the shaft carrying the reflector so as to project the beam of light in a light pattern as a generatrix of a right conical surface upon rotation of the motor. The worm gear relationship between the non-intersecting shafts completely eliminates the necessity of providing separate reduction means and also facilitates the housing of the warning light components in a compact enclosure.

The parabolic reflector is preferably constructed to reflect a pencil-type beam having a beam spread of predetermined angular divergence. The angular offset between the longitudinal axis and the axis of rotation of the reflector should be greater than the predetermined angular divergence of the beam spread.

According to the principles of the present invention, the lens provided on one side of the ring preferably takes the form of an optical spreading lens optically characterized to increase the beam spread of the pencil-type beam in the direction of one conjugate only without materially increasing the beam spread in the direction of a second conjugate normal to the one conjugate. The angular divergence of the spread beam should be greater than the angular offset between the longitudinal axis and the axis of rotation of the reflector.

There is thus produced a frustum in the light pattern having a substantial finite area which is traversed a plurality of times by the beam in the direction of the second conjugate upon each single generation of the conical surface.

It is an object of the present invention to provide method and means for producing a movable light pattern having unusually distinctive visual characteristics.

Another object of the present invention is to provide a method of producing a movable light pattern wherein a multiple flash effect will be produced in a substantial area of the light pattern.

A further object of the present invention is to provide a warning light structure which is particularly compact but which will project a beam of light in a moving pattern having distinctive visual characteristics.

Yet another object of the present invention is to provide a warning light apparatus wherein all the components of the apparatus are carried on an annular support frame member.

A further object of the present invention is to provide a warning light with a movable reflector driven through a worm gear drive actuated by an electric motor.

Many other features, advantages and additional objects of the present invention will become manifest to those versed in the art upon making reference to the detailed description which follows and the accompanying sheets of drawings in which a preferred structural embodiment of a warning light incorporating the principles of the present invention and capable of practicing the methods of the present invention as shown by way of illustrative example.

On the drawings:

Figure 1 is a side elevational view with parts broken away and with parts shown in cross-section showing a warning light constructed in accordance with the principles of the present invention;

Figure 2 is a plan view of the mounting ring or annular frame member provided in accordance with the principles of the present invention;

Figure 3 is an end elevational view of the ring or frame member shown in Figure 2;

Figure 4 is a cross-sectional view taken through an optical spreading lens which may be provided in accordance with the principles of the present invention in connection with the warning light structure shown in Figure 1;

Figure 6:
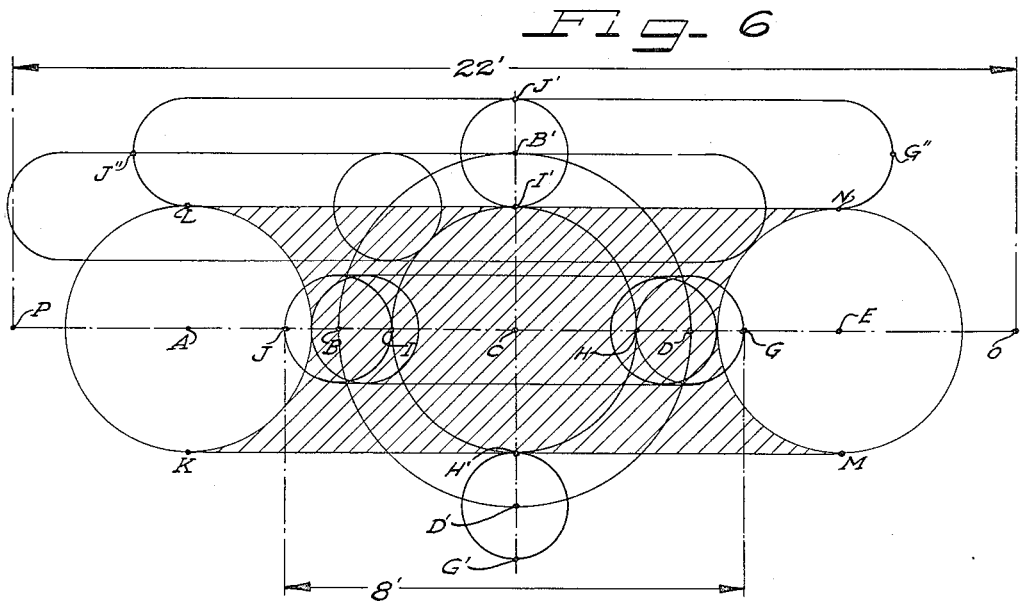
Figure 5:
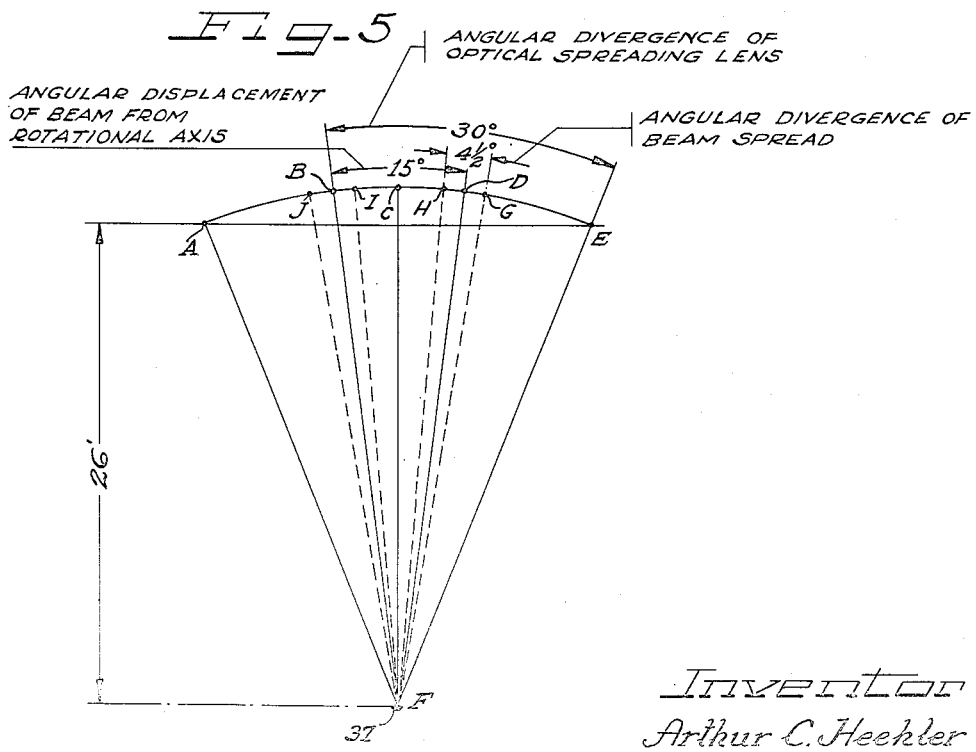

Figure 5 is a plan view showing diagrammatically various angular relationships in connection with the beam pattern produced in accordance with the principles of the present invention and identifying certain variables which are closely controlled in accordance with the principles of the present invention to provide a movable light pattern of distinctive character; and Figure 6 is a diagrammatic view showing a portion of a frustrum of the generated cone traced by the moving beam in accordance with the principles of the present invention and showing the area wherein a multiple flash effect occurs.

As shown on the drawings:

The warning light of the present invention is indicated generally by the reference numeral 10 and comprises an annular frame member or ring 11 having a recess 12 formed in one face thereof to seat an annular rubber gasket 13 which is U-shaped in cross-section and which receives an annular flange 14 of a lens member 16 which extends forwardly of the frame member 11 and which also extends across a central opening 17 provided by the frame member 11 on a longitudinal axis extending therethrough. If desired, the lens member 16 may be colored so as to impart color characteristics to any rays of light passing therethrough.

As is clearly shown in the drawings, the frame member 11 is provided with a rearwardly extending bracket portion 18 which terminates in a flat plate portion 19 suitably apertured as at 20 to receive a plurality of fasteners mounting an electric motor 21 in firm assembly therewith.

The electric motor 21 has a power takeoff shaft or drive shaft 22 provided with a worm 23 extending from a face 24 of the electric motor 21 lying in a plane generally normal to the flat surface 19 on the bracket 18.

The motor 21 is further provided with a pair of longitudinally spaced bearings 26 and 27 respectively which protrude from the face 24 and lie adjacent opposite sides of the drive shaft 22.

A rotatable shaft 28 is journaled in the bearings 26 and 27 and is rotatably supported thereby, the shaft 28 being provided with a gear 29 co-rotatable therewith and engaging the worm 23 so as to rotate the shaft 28 whenever the motor 21 is actuated.

A wiring connector block 30 having terminal portions indicated at 31 is provided for the motor 21 and may be electrically connected to a pair of conductors 32 leading to a suitable source of current supply.

The shaft 28 is provided with a free end 33 which extends towards the annular frame member 11. The shaft 28 lies on a rotational axis indicated by legend which is angularly offset by a predetermined angular divergence from the normal longitudinal axis extending through the center of the frame member 11. A representative angular divergence would be approximately 7½°.

A support spider 34 having a plurality of circumferentially spaced fingers 36 carries a reflector 37 in firm assembly therewith by means of a plurality of clip fasteners 38 for the arms or fingers 36 provided on the support spider 34.

The support spider 34 has a hub portion 39 apertured as at 40 to receive the free end 33 of the shaft 28. A set screw 41 is received in the hub portion 39 and may be threadedly engaged against the free end 33 of the shaft 28 in order to lock the reflector 37 in co-rotatable assembly with the shaft 28 and at adjusted points along the rotational axis thereof.

The fingers 36 of the support spider 34 support the reflector 37 relative to the rotational axis of the shaft 28 in offset relation so that rays of light collected and focused by the reflector 37 will be projected in the form of a beam moving through a light pattern as the generatrix of a right conical surface.

A U-shaped clip member 42 has one leg connected to the inside of the frame member 11 by a fastener 43 and projects radially inwardly towards the center of the frame member 11, there being a socket 44 connected to the other leg of the clip member 42 which receives an incandescent lamp bulb 46 which forms the light source for the warning light 10. It will be understood that the hub portion 39 of the support spider 34 may be longitudinally adjusted on the shaft 28 and locked in position by the set screw 41 so that the filament of the light bulb 46 will lie approximately at the focal point of the reflector 37, thereby achieving a desired control of the beam of light.

A hollow casing made of sheet metal and indicated at 47 is provided with an annular open end 48 which fits snugly around the annular frame member 11. The open end 48 is preferably crimped to provide an annular recess 49 so that the shoulder at the base of the recess will bottom the annular frame member 11.

An annular bezel ring made of thin sheet metal is indicated at 50 and has an inwardly directed flange 51 which engages the gasket 13 and is further provided with a flange 52 so that the bezel ring 50 together with the casing 49 may be placed in firm assembly with the annular frame member 11.

The bezel ring 50 is preferably split and adjacent the split portions thereof are provided a pair of opposed ear portions one of which is indicated at 54 suitably apertured to receive fastening means 56 for drawing the opposed members 54 together and for collapsing the bezel ring 50 radially, thereby clamping the various components of the lamp into firm assembly with the annular frame member 11.

A support member 57 is securely fastened to the casing 47 by a plurality of rivets 58 and is provided with a pivot portion 59 which cooperates with a mounting bracket 60 so that the warning light 10 may be firmly supported by means of the bracket 60 on a supporting surface such as the roof or fender of an emergency vehicle. The pivot pin between the bracket 60 and the pivot portion 59 of the support member 57 preferably takes the form of a bolt 61 so that adjusted positions of the casing 47 relative to the bracket 60 may be firmly locked.

It should be particularly noted that the shafts 22 and 28 comprise a pair of non-intersecting shafts which make an angle of 90° with each other and which are concurrently rotated by means of a worm and gear driving connection, thereby completely eliminating the necessity of providing the cumbersome and bulky gear reduction box which is frequently required in apparatus of this type.

In optical terms, it is well known that a bundle of rays originating at a single point is known as a "pencil." The light used for all practical purposes, however, comes from sources of finite area, every point of which emits a "pencil" of light. Thus, in optical terms, a group of "pencils" is known as a "beam." Theoretically, the rays of light which are collected and focused by a parabolic reflector surface will be projected in the form of a beam having straight parallel sides.

Thus, the distinction between the concepts of a "ray" of light, a "pencil" of light and a "beam" of light is often illustrated by the statement that a ray of light will pass through two infinitely small holes, a pencil of light will pass through one small hole and one large hole, while a beam of light requires the provision of two large holes.

In the warning light industry, the term "pencil beam" is sometimes used to characterize a light beam having sharp definition and virtually parallel sides. However, for purposes of this disclosure, the term "pencil-type beam" will be used in its optical sense to designate a beam of light having angular divergence of finite amount.

As a practical matter, in warning light apparatus the filaments conventionally used extend over substantial area and when used with a reflector such as is particularly suited for use in the warning light 10 described above will not project a beam of light having straight parallel sides but will project a pencil-type beam of light which diverges angularly and thereby constitutes a conical section extending from the reflective surface of the reflector. The amount of angular divergence of a beam of light such as is provided with the reflector 37 in the warning light 10 is characterized in the art by the term "beam spread."

For example, it has been found that the reflector 37 of the warning light 10 preferably takes the form of a 6" parabolic reflector having a beam spread of approximately 4½° angular divergence.

It will be apparent, therefore, that rotation of the shaft 28 will eccentrically rotate the reflector 37 so that a conically shaped beam of light will be moved in a light pattern around the axis of rotation as a generatrix of a right conical surface. In Figure 1, there is shown the uppermost beam centerline and the lowermost beam centerline displaced angularly with respect to the axis of rotation. The angle of displacement is equal to the angular eccentricity of the reflector with respect to the rotational axis. One of the most important characteristics of a movable beam tracing a light pattern in a field of vision is the flash effect which is given the observer when the beam of light impinges upon the visual field of the observer. It is important to note that the flash effect occurs only when a complete traverse of the beam occurs relative to the visual field or whenever relative intersection of the beam and the visual field occurs. In other words, if the movable beam of light is so widely diverged that a complete traverse will not occur during a single cycle of movement of the beam of light, a corresponding flash effect will not be produced but the observer looking towards the movable light source will receive the impression that the light is steady and continuous.

Thus, in the preferred structural embodiment of Figure 1, the angular eccentricity of the parabolic reflector 37 relative to the rotational axis of the shaft 28 is preferably equal to an angle greater than the angular divergence of the beam spread of the reflector 37. For example, if the angular eccentricity of the reflector 37 relative to the rotational axis of the shaft 28 is 7½° and the angular divergence of the beam spread is 4½°, the moving reflector will project the beam in a light pattern as the generatrix of a right circular cone so that any frustrum taken along the longitudinal axis of the cone will constitute a circular area traced by a smaller circular area corresponding to the corresponding frustrum taken along the length of the conically shaped pencil-type beam of light.

Another way of expressing this phenomenon is to state that a frustrum of the pencil-type beam of light will constitute a circular area having equal conjugate diameters normally disposed and which are smaller than corresponding normally disposed conjugate diameters measured on the circular area on the corresponding frustrum of the generated cone.

Thus, the observer within visual range of the light pattern will not only observe the oscillatory movement of the pencil-type beam of light but if the observer happens to be in frustrum of the light pattern, a flash effect will be observed upon each single generation of the conical surface by the pencil-type beam of light.

In my copending applications, Serial No. 180,775, filed August 22, 1950, and Serial No. 191,007, filed October 19, 1950, I have disclosed oscillating mechanisms for warning lights wherein the pencil-type beam of light will move in a light pattern as the generatrix of a right conical surface and wherein any frustrum of the cone can take the form of an elliptical area having a major horizontal axis and a minor vertical axis.

With such a light pattern, it will be apparent that a flash effect will be produced only if the angular divergence of the beam spread is less than the angular divergence included by the minor axis of the elliptical path traced by the moving beam of light. In other words, if a frustrum of the pencil-type beam of light is considered as having normally disposed conjugate diameters which are horizontal and vertical respectively, the conjugate diameters must both be less than the minor axis of the corresponding elliptically shaped frustrum of the generated cone.

It will be apparent that the characteristics of the light pattern produced by the movable beam can be controlled and regulated by selectively altering within critical limits the significant variables which affect the distinctiveness of the light pattern. Referring now to Figures 5 and 6, there is shown in diagrammatic form exemplary type of light pattern produced with an actual structure. In Figure 5, the parabolic reflector is indicated at 37 and it will be understood that this element corresponds to the reflector 37 as shown in Figure 1 or to the reflector or reflective surface provided in the warning light structures disclosed in my above acknowledged copending applications. For purposes of illustration, it is assumed that the parabolic reflector 37 constitutes a so-called 6" reflector. The normal longitudinal axis of the reflector is indicated by the line FC and, in this instance, this axis would correspond with the axis of rotation of the shaft 28 provided in Figure 1.

The angular displacement of the beam from the rotational axis FC is determined by the eccentricity of the reflector 37 relative to the axis of rotation and in this particular instance is assumed to be approximately 7½°. In one extreme position, as shown in Figure 5, the angular displacement is equal to the angle CFD and in the other extreme position the angle of displacement is equal to the angle CFB. The total included angle between extremes is indicated by the characters BFD and in this illustrative embodiment will be equal to 15°.

As explained above, it is assumed that the 6" parabolic reflector 37 has a 4½° angular divergence of beam spread which divergence is indicated on Figure 5 by the angle HFG, or by the angle JFI.

The reflector 37 is moved so that the beam projected thereby will trace a light pattern as the generatrix of a right conical surface. It will be understood that the term "conical surface" is used in its generic sense to indicate the surface of a right circular cone as well as the surface of a cone wherein any frustrum of the cone would depart from a circular shape, for example, a cone wherein any frustrum would be elliptically shaped as might be developed by a warning light structure such as that disclosed in my above acknowledged copending applications for patent.

In any event, the warning light structure shown in Figure 1 will develop a light pattern wherein the beam moves as the generatrix of a right circular cone.

To demonstrate the characteristics of the light pattern as such characteristics would appear to an observer, a frustrum is considered and is shown in Figure 6 corresponding to a plane intercepting the cone at a distance of 26 feet from the 6" parabolic reflector 37. It will be noted that the pencil-type beam of light projected by the reflector 37 traces a circular path BB'DD'. The normally disposed conjugate diameters of the circular frustrum area are indicated by the diametral lines JG and J'G'.

If a warning light structure were provided similar to that disclosed in my acknowledged copending applications, the frustrum area could be made to assume an elliptical shape wherein conjugate major and minor axes would be provided, the line JG constituting a major horizontal axis and the line J'G' constituting a minor vertical axis.

It will be apparent that the light pattern thus far described would be characterized by a single flash effect upon each single generation of the conical surface as long as the angular divergence of the beam spread HFG is maintained at an angle less than the angular displacement of the beam from the rotational axis FC, for example, the angle CFD. In terms of an elliptically shaped frustrum, it may be stated that the conjugate diameters of a frustrum of the beam cone, for example, HG and H'G' should be less than the major and minor axes of the corresponding frustrum of the generated cone, for example, the major axis JG or the minor axis J'G'.

It may be noted that the sweep of the beam pattern provided by the preferred structural embodiment herein described is approximately 3 feet (JG) at a distance of 26 feet from the reflector 37.

In accordance with the principles of the present invention, the horizontal sweep of the light pattern is greatly increased and an unusual distinctiveness is embodied in the light pattern by interposing in the path of the moving beam of light an optical spreading lens 16 which, as shown in Figure 4, is provided with prism portions 15 and which is constructed to spread the beam of light in the direction of one conjugate so as to greatly increase the normal angular divergence of the beam spread in the direction of the one conjugate without materially increasing the normal angular divergence of the beam spread in the direction of a second conjugate normal to the first conjugate.

In the preferred embodiments herein described, the optical spreading lens 16 is mounted on the annular frame member 11 to spread or increase the angular divergence of the normal beam spread in a horizontal direction without materially increasing the beam spread in a vertical direction. Thus, instead of projecting a conically shaped shaft of light, the beam assumes the shape of a flat bar of light indicated diagrammatically on Figure 6 by the area J''I'G''J'.

Upon moving the reflector 37, the pencil-type beam will again move as the generatrix of a right conical surface, however, a frustrum in the light pattern will be particularly characterized by a finite area which is traversed a plurality of times by the beam of light upon each single generation of the conical surface. A geometrical development indicates as shown on Figure 6 that the finite area referred to is bounded by the characters KH'MNI'L. Any observer having a visual field within this area will have impinged upon his field of vision a multiple flash effect as the area is traversed a plurality of times upon each single generation of the conical surface by the beam of light. Moreover, if the observer moves to the right or to the left of the critical multiple flash area, a single flash will be impinged upon his field of vision to an extreme position greatly exceeding the normal sweep limits of an ordinary warning light. Thus, it may be noted that the extreme sweep of the modified light pattern using an optical spreading lens 16 optically designed to provide a 30° angular divergence will lie between the points P and O, a distance of approximately 22 feet measured on a frustrum of the light pattern 26 feet from the reflector 37, an increase of 2½ times.

Although the particular example described utilizes a 30° spreading lens 16, it will be appreciated that the angular divergence of the spreading lens must be greater than the angular displacement of the beam from the rotational axis in order that a finite multiple flash area will result.

In a structure wherein an elliptical path is traced by the beam of light, the angular divergence of the optical spreading lens 16 must be such that the width of the resulting beam of light measured at any particular frustrum of the light pattern must be greater than the major axis of the corresponding elliptically shaped frustrum of the generated cone. In other words, the width J″G″ must be greater than the major axis JG.

It should be particularly noted that the improved beam characteristics afforded through the practice of the present invention are highly advantageous when applied to an emergency vehicle. Not only is the horizontal sweep of the light pattern greatly increased so that the warning light 10 can be advantageously mounted to project a moving light pattern in the direction of travel of the vehicle with adequate effect to observers approaching the intended path of travel of the emergency vehicle, but a multiple flash effect is produced throughout a finite area lying directly in the path of intended travel of the vehicle.

Although various minor modifications might be suggested by those versed in the art to the preferred embodiments herein described by way of illustrative example, it should be understood that I wish to embody within the scope of the patent warranted hereon all such modifications as reasonably and properly come within the scope of my contribution to the art.

I claim as my invention:

1. A warning light, comprising, an annular frame member having a center opening therethrough lying on a longitudinal axis and an incandescent lamp bulb carried on the inside of said frame member and extending towards the center thereof, said frame member having a rearwardly projecting bracket portion carrying an electric motor, a power takeoff extending from said electric motor and comprising a drive shaft provided with a worm, a pair of spaced bearings on said motor disposed on opposite sides of said drive shaft, a rotatable shaft in said bearings and having a free end extending toward said ring, said rotatable shaft being disposed on a longitudinally extending axis of rotation, said rotatable shaft being disposed normal to said drive shaft in adjacent non-intersecting relation and having a gear thereon engaged by said worm, a reflector having a hub portion receiving the free end of said rotatable shaft, connecting means locking said reflector to said shaft with said lamp bulb at the focal point of said reflector, said reflector being eccentrically offset relative to the axis of rotation of said rotatable shaft, casing means extending rearwardly from said ring and enclosing said motor and said reflector, and a lens on the opposite side of said ring, said motor driving said shaft through said worm and said gear to move a beam of light projected by said reflector through said lens in a light pattern as the generatrix of a right conical surface.

2. A warning light as defined in claim 1 wherein said reflector is constructed to reflect a pencil-type beam of light having a beam spread of predetermined angular divergence, said offset of said reflector with respect to said axis of rotation of said rotatable shaft being greater than said predetermined angular divergence of said beam spread, and said lens consisting of an optical spreading lens having means increasing the beam spread of said pencil-type beam in the direction of one conjugate thereof only without materially increasing the beam spread in the direction of a second conjugate thereof normal to said first mentioned conjugate to an angular divergence greater than the said angular offset of said reflector with respect to said axis of rotation of said shaft to produce a frustrum in the light pattern having a finite area traversed a plurality of times by said beam upon each single generation of said conical surface.

3. In a warning light, an electric motor, a reflector, a pair of non-intersecting shafts making an angle of 90° with each other, one of said shafts comprising a drive shaft for said motor and having a worm thereon, the other of said shafts carrying said reflector and having a gear engaging said worm, said reflector being angularly offset relative to the rotational axis of the said other of said shafts to project the beam of light in a light pattern as a generatrix of a right conical surface upon rotation of said motor.

4. In a warning light as defined in claim 4, an annular ring member carrying a light bulb on the inside thereof and extending towards the center of the ring member and being provided further with a bracket portion mounting said motor and said shafts to position said light bulb at the focal point of said reflector.

5. A warning light, comprising, a concavo light source surface projecting a pencil beam along a longitudinal beam axis, means moving said surface to rotate said pencil beam on an offset axis of rotation displaced from said beam axis by a predetermined angle of displacement to generate a generally conical light pattern, said light source surface having a beam spread of an angular divergence less than said predetermined angle of displacement, and a spreading lens interposed in the path of said pencil beam and being constructed to spread said pencil beam in one lateral direction only into the form of a flat pencil-type beam extending through an angular divergence greater than said predetermined angular displacement, said surface, said lens, and said means rotating said surface together providing a conical frustrum in said light pattern having a finite area traversed by said flat pencil-type beam a plurality of times upon each single rotation of said surface.

6. A warning light comprising, a movable reflector, a light source at the focal point of said reflector, motor means to move said reflector, said reflector arranged to collect and focus rays of light emitted by said light source and constructed to project a pencil-type beam of light along a longitudinal beam axis and having a beam spread of a predetermined angular divergence, connecting means operably connecting said reflector to said motor means and positioning said reflector to move said pencil-type beam of light in a light pattern as the generatrix of a conical surface upon actuation of said motor means, the offset of said reflector from said longitudinal axis being equal to an angle greater than the said angular divergence of said beam spread, and a spreading lens interposed in the path of said pencil-type beam, said spreading lens being constructed optically to spread said pencil-type beam in one lateral direction only through an angular divergence greater than said offset angle, said lens and said movable reflector together providing a conical frustrum in the light pattern having a finite area traversed a plurality of times by the beam of light upon each single generation of said conical surface.

7. A warning light as defined in claim 7 wherein said connecting means operably connect said reflector and said motor means and position said reflector to move said pencil-type beam of light in a light pattern as the generatrix of a right circular conical surface and wherein said lens and said movable reflector provide a circular conical frustrum having a finite area traversed a plurality of times by the beam of light upon eah single generation of said conical surface.

8. A vehicular warning light, comprising; a movable reflector, a light source at the focal point of said reflector, oscillating means to move said reflector, said reflector arranged to collect and focus rays of light emitted by said light source and being constructed to project a pencil-type beam of light along a longitudinal beam axis and having a beam spread of a predetermined angular divergence, connecting means operably connecting said reflector and said oscillating means and positioning said reflector to move said pencil-type beam of light in a light pattern as the generatrix of a right peripheral cone surface wherein any frustrum of the cone generated thereby and taken normal to said longitudinal axis is elliptical with a horizontal major axis and a vertical minor axis, the vertical transverse offset of said oscillating means being constructed to provide a vertical transverse minor axis for any of said frustrums which will include a cone angle greater than the said predetermined angular divergence of said beam spread, the horizontal transverse offset of said oscillating means being constructed to provide a horizontal transverse major axis for any of said frustrums which will include a cone angle of predetermined angular divergence, and a spreading lens interposed in the path of said pencil-type beam, said lens having an optical spreading characteristic to increase the horizontal spread of the pencil-type beam to an angle greater than the said cone angle of predetermined angular divergence without materially affecting the vertical spread of the pencil-type beam, said lens and said movable reflector providing an elliptically shaped conical frustrum having a finite area traversed a plurality of times by said beam upon each single generation of said cone surface.

ARTHUR C. HEEHLER.

References Cited in the file of this patent

UNITED STATES PATENTS

| Number | Name | Date |
|---|---|---|
| 2,446,333 | Kennelly | Aug. 3, 1948 |
| 2,548,154 | Gosswiller | Apr. 10, 1951 |
| 2,607,838 | McDowell | Aug. 19, 1952 |
| 2,607,839 | Heehler | Aug. 19, 1952 |